(12) United States Patent
Vartorella

(10) Patent No.: US 12,096,091 B2
(45) Date of Patent: Sep. 17, 2024

(54) FACIAL RECOGNITION SOFTWARE (FRS) INTERACTIVE IMAGES PLACED ON A MOVING RACE VEHICLE

(71) Applicant: William Frederick Vartorella, Camden, SC (US)

(72) Inventor: William Frederick Vartorella, Camden, SC (US)

( * ) Notice: Subject to any disclaimer, the term of this patent is extended or adjusted under 35 U.S.C. 154(b) by 0 days.

(21) Appl. No.: 18/493,361

(22) Filed: Oct. 24, 2023

(65) Prior Publication Data

US 2024/0056652 A1 Feb. 15, 2024

Related U.S. Application Data

(63) Continuation-in-part of application No. 17/897,558, filed on Aug. 29, 2022, now abandoned, and a continuation-in-part of application No. 17/524,802, filed on Nov. 12, 2021, now abandoned.

(51) Int. Cl.
*H04N 21/81* (2011.01)
*H04N 21/234* (2011.01)
*H04N 21/472* (2011.01)

(52) U.S. Cl.
CPC ..... *H04N 21/812* (2013.01); *H04N 21/23412* (2013.01); *H04N 21/472* (2013.01)

(58) Field of Classification Search
CPC ........... H04N 21/812; H04N 21/23412; H04N 21/472; H04N 23/633; H04N 7/183; H04N 21/4223; H04N 21/23418; G09F 21/048; G06T 7/60; G06T 7/246; G06T 7/70; G06T 7/001; G06T 7/0014; G06V 20/62; G06V 40/172; G06V 10/764

USPC .......................................................... 725/113
See application file for complete search history.

(56) References Cited

U.S. PATENT DOCUMENTS

| 2007/0022447 | A1 | 1/2007 | Arseneau et al. |
| 2008/0154944 | A1* | 6/2008 | Erdos ................. G06Q 30/0603 |
| | | | 707/999.102 |
| 2009/0008955 | A1* | 1/2009 | Desoto .................... G09F 21/04 |
| | | | 40/591 |
| 2018/0129917 | A1* | 5/2018 | Chu ....................... G06V 20/48 |
| 2018/0270427 | A1* | 9/2018 | Damstra .......... H04N 21/21805 |
| 2018/0341812 | A1* | 11/2018 | Floor ..................... G06V 20/42 |
| 2019/0027072 | A1* | 1/2019 | Labowsky .............. G09F 21/20 |

(Continued)

FOREIGN PATENT DOCUMENTS

KR 101934973 81 1/2019

OTHER PUBLICATIONS

W. Hogpracha and S. Vongpradhip, "Recognition system for QR code on moving car," 2015 10th International Conference on Computer Science & Education (ICCSE), Cambridge, UK, 2015, pp. 14-18, doi: 10.1109/ICCSE.2015.7250210. (Year: 2015).*

(Continued)

*Primary Examiner* — Cynthia M Fogg
(74) *Attorney, Agent, or Firm* — James G. Passe; Passe Intellectual Property

(57) ABSTRACT

A system for placing real-time interactive images on, inside, or in the general vicinity of a moving vehicle, during a live feed, wherein a user has the capability to pause and then click on the provided HTML hyperlinks with the goal of a user learning more about an image and related products. The Images are read by Facial Recognition Software comparing a limited database of images.

6 Claims, 4 Drawing Sheets

(56) References Cited

U.S. PATENT DOCUMENTS

| | | | |
|---|---|---|---|
| 2019/0043207 A1* | 2/2019 | Carranza | G06V 20/52 |
| 2021/0004626 A1* | 1/2021 | Hsu | G06V 10/267 |
| 2021/0114462 A1* | 4/2021 | De Castro Turner | B60K 35/00 |
| 2022/0074181 A1 | 3/2022 | Shimuta et al. | |
| 2022/0230436 A1* | 7/2022 | Floor | G06V 20/42 |
| 2022/0253889 A1* | 8/2022 | Cooper | G06F 16/9558 |
| 2022/0319204 A1* | 10/2022 | Zeng | G06V 30/12 |
| 2023/0065676 A1* | 3/2023 | Obstfeld | H04L 67/12 |

OTHER PUBLICATIONS

Wikipedia, 1st & Ten (graphics system), https://en.wikipedia.org/wiki/1st_%26_Ten_(graphics_system), Jun. 21, 2022, 1-4.
Wikipedia, Chroma key, https://en.wikipedia.org/wiki/Chroma_key, Jul. 18, 2022, 1-8.
Tanaka and Simonyi, The "parts and wholes" of face recognition: a review of the literature, Q J Exp Psychol (Hove). Oct. 2016 ; 69(10): 1876-1889. doi: 10.1080/17470218.2016.1146780.
Zhao et al., Face Recognition: A Literature Survey, ACM Computing Surveys, vol. 35, No. 4, Dec. 2003, pp. 399-458.
Redmon et al., You Only Look Once: Unified, Real-Time Object Detection, University of Washington, Allen Institute for AI, Facebook AI Research, http://pjreddie.com/yolo/.

\* cited by examiner

FACIAL RECOGNITION SOFTWARE (FRS) INTERACTIVE IMAGES PLACED ON A MOVING RACE VEHICLE

This application is a continuation-in-part of U.S. non-provisional patent application Ser. No. 17/897,558 filed on Aug. 29, 2022, which is a continuation-in-part of U.S. non-provisional patent application Ser. No. 17/524,802 filed on Nov. 12, 2021, which is incorporated herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a system for placing real-time, interactive information on, inside, or in the general vicinity of a moving vehicle via a digital image, which is read by Facial Recognition Software (FRS).

Description of Related Art

The placement of advertising, logos and other information in the form of an image on moving vehicles has become an extremely beneficial marketing tool for companies to advertise and market their product(s), or service(s) outside and inside of a moving vehicle. In recent years, this has been done by use of a digital imprinted vinyl wrap and is usually a continuous single wrap on the outside of the vehicle. A problem with advertisements located on the outside or inside a vehicle is that in a real-time situation, the vehicle is moving at high speeds and advertisements, logos, information, etc., may be hard to view, especially at high speeds. Since people might not have something to write the information down on, the information effectiveness is greatly diminished. In addition, since the vehicles may be moving extremely fast, it is frequently difficult to see or read the images because of the acute viewing angle, much less comprehend what you are looking at.

There have been attempts to address advertising through video playback, but none of these attempts address or are capable of interactive digital advertising with real-time moving billboards (the moving vehicle) where the images are fast moving and present at acute angles.

Facial Recognition Technology is poorly understood, primarily because machine learning is unpredictable. For example, Facial Recognition Software often fails because the facial expression of human emotion (smile, grimace, laugh, and the like) varies across ethnicities and cultures.

Prior to Applicant's invention, clickable images relied on reading QR codes and/or an advertisement embedded in a clickable image which needs to be read head on to be readable and establish a link to be made. In addition, QR codes take up considerable space and detract from logo types on the vehicle. However, in a typical vehicle race (e.g. a street circuit, road race, and the like), 75% of camera angles are oblique because of this constant change in view perceived by a camera as the vehicle moves. In addition, they detract from other logo types on the vehicle as QR codes would take up considerable space since they are visible from just viewing. Some 20% of the vehicle outer surface is not usable with the prior art technology. The oblique angles and speed of a moving vehicle, especially during a car race, means very infrequently will any clickable advertisement be at a proper angle to be able to be clicked on or scanned (the QR codes or embedded advertisement) successfully. In addition, darkness (dark logo and ambient light darkness) creates an additional problem with reading the codes even perpendicular to the camera.

BRIEF SUMMARY OF THE INVENTION

The present invention relates to a system for advertising on a moving vehicle where a finite number of interactive images are digitally placed on, inside, or in the general vicinity of the vehicle. The live-action advertisement can be paused and the advertising is digitally interactive, links to a web site, hyperlink, or other online information, thus allowing a user to interact with the image before it disappears.

Accordingly, in one embodiment, there is a system for reading a finite number of images having HTML machine readable pixels on a moving vehicle in a vehicle race comprising:
  a) a computer having the finite number of images in memory, the computer capable of receiving a video feed of an image on a moving vehicle in the vehicle race;
  b) facial recognition software in the computer which compares the finite number of images on the video feed with the finite number of images in the computer database to select the image in the database that matches the video feed image.
  c) wherein the facial recognition software can read the image at oblique angles and at high speed relative to a camera and match the image against the database images; and
  d) wherein the software can open up a website associated with the matched database image.

DETAILED DESCRIPTION OF THE INVENTION

Figure 1A:
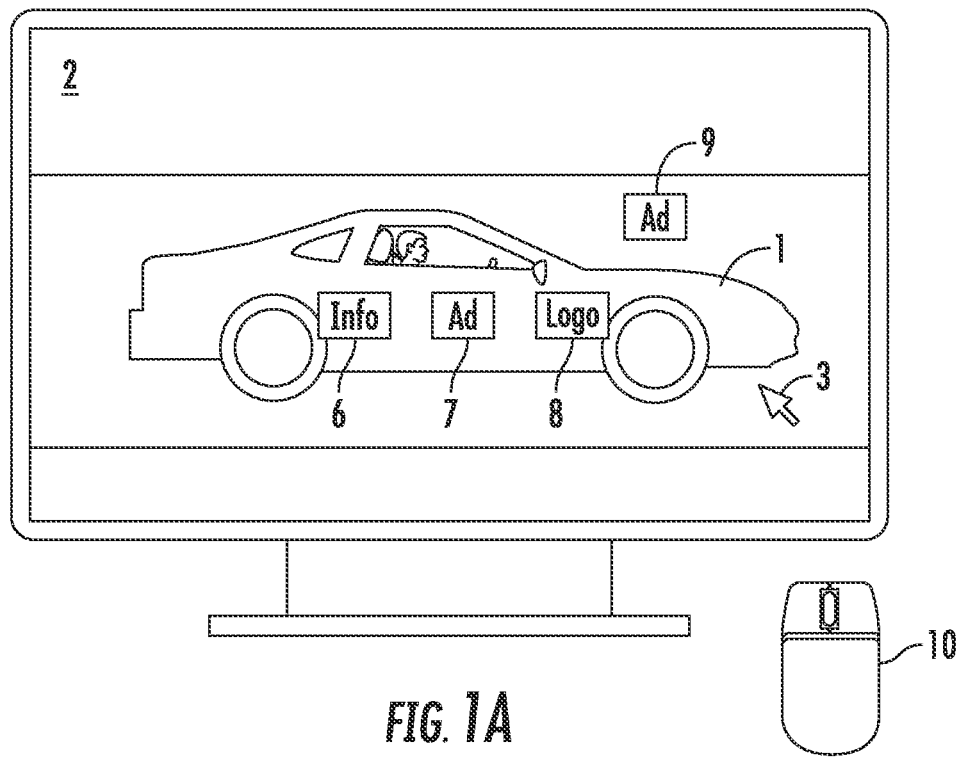
FIG. 1a is a side view perspective of the present invention showing a moving vehicle on a computer screen with digital interactive images.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "image" refers to limited number of images used in the race during a live feed of a moving vehicle race. The term advertising is used in a broad sense so as to not only include product placement advertising, but also any other event, place, organization, logo, website, game, camera angle, interviews, and the like, to be reached through the digital interactive advertising and then provide a hyperlink for information relating to the advertisement. There will be a finite number of images during a vehicle race so software matching is more readily achieved than with an unlimited number of images, especially ones that change shape such as a face.

As used herein, the term "on, inside, or in the general vicinity" refers to placements of one of a limited number of images on the outside of the vehicle, inside of the vehicle, or in the general vicinity of the moving vehicle during a vehicle race (e.g. NASCAR®). Images are placed digitally or on a material, such as a wrap, sticker, or decal, via a digital printer with embedded HTML, which may also be applied to a painted surface. When the vehicle is moving, and when the live action is paused/stopped, the digital image remains as an active HTML hyperlink even if the vehicle is moving fast and the image is at an oblique angle to the camera. In one embodiment, the advertisement is placed on a HTML-configured vinyl wrap with pixels that are clickable. The pixels with HTML are placed on the wrap (via printing) to become clickable. In another embodiment, the material used to place an image is a sticker, decal, and the like.

As used herein, the term "in the general vicinity of the moving vehicle" refers to the area near or surrounding the vehicle during a vehicle race. For example, the stands, crowds, billboards, event personnel, concession stands, entertainment props, such as, ramps, and the like, and in the vicinity. The term also refers to the surrounding area around the moving vehicle that is associated with the vehicle because the vicinity is on the same live feed as the vehicle during a race. For example, in a car race, the pit, the tracks, race track field, race team personnel, equipment for moving vehicles, such as, tires, balloons, tools, and the like, are in the vicinity of the moving vehicle.

As used herein, the term "moving vehicle" refers to any powered vehicle in a vehicle race moving during a live feed. In one embodiment, the vehicle is a race vehicle, which would be in a race (e.g., race car, race boat, racing motorcycle, racing plane, racing balloons, and the like).

As used herein, the term "real-time moving vehicle" refers to a live feed relating to a moving vehicle in a race that is broadcast and transmits to a computer for viewing, allowing the user to click on any number of the image HTML hyperlinks associated with the image.

As used herein, the term "feed" refers to the seeing and hearing of the moving vehicle live, which is occurring at the same time as it is being viewed by a user, including streaming, Cable TV, emerging technologies, and the like.

As used herein, the term "computer" refers to, for example, one or more servers, motherboards, processing nodes, laptops, tablets, personal computers (portable or non-portable), personal portable information terminals, smart phones, smart watches, Smartband, cell phone or mobile phone, another mobile device having at least a processor and memory, a video game system, an augmented reality system, a holographic projection system, a television, a wearable computer system, an Internet of Things node, and/or it may also include other device(s) providing one or more processors that are at least partially controlled by instructions. The instructions may be in the form of firmware or other software in memory and/or special circuitry. The computer can store the limited number of images and match them to an image on a vehicle. Facial Recognition Software in the invention is highly accurate due to limited number of exact images it needs to match, and the image is static as opposed to a human face, which can move and change shape making readings not that accurate and not very fast to produce results. Any standard facial recognition software can be adopted for this novel use based on the disclosure herein.

As used herein, the term "real-time stop-action pause" refers to the ability to pause a live broadcast of a moving vehicle being viewed on a computer. This is required to preserve the HTML hyperlink associated with the real-time digital interactive images and make it easier and more reasonable to click the HTML hyperlink.

As used herein "facial recognition software" refers to a face analyzer software that is normally used to identify or confirm a person's identity using details of their face. It works by identifying and measuring facial features in an image. Facial recognition can identify human faces in images or videos, determine if the face in two images belongs to the same person, or search for a face among a large collection of existing images. Biometric security systems use facial recognition to uniquely identify individuals during user onboarding or logins as well as strengthen user authentication activity. Mobile and personal devices also commonly use face analyzer technology for device security. Detection is the process of finding a face in an image. Facial recognition can detect and identify individual faces from an image containing one or many people's faces. It can detect facial data in both front and side face profiles. In order to do that human facial factors must be employed in addition to modeling distances between points. It must also consider ethnicity and variations in position of those points based on normal facial activity. Accordingly, it is prone to mistakes, takes a lot of processing power, and can be relatively slow to match a face especially when there are thousands of faces being looked at or the distortion of the face is large. Facial software in the present invention is adapted to recognize an image of the invention rather than a face. It works by programing the software to pinpoint predetermined points on the image and the image in the database. However, images of the present invention do not need to consider points moving relatively, facial expressions or anomalies, and other variations of the human face. Since each image to be compared will be identical without variation, the software is more accurate, faster, and uses much less computing power. It can compare images then at acute angles and images that are moving at high speeds. This is a new use of facial recognition software and greatly improves the result compared to prior technologies.

The present invention exploits this traditional livery placement and the modularity of a modern race vehicle. Essentially, the racecar becomes a predictable, unexpressive face with the cockpit as its "eye" and images—sponsor images and the like—as the non-biometric keys to be pinpointed, measured against the limited database of images described, identified, and linked to user content. Off-the-shelf Facial Recognition Software, code, and neural networks are easily applied based on the disclosure herein. It's the html tag on the vinyl wrap that enhances the Facial Recognition Software's (FRS) ability to read the pixels that is an important aspect of our Invention that is not predicted by Prior Art and, with oblique angles at speed, exploits FRS in a manner also not anticipated by Prior Art. The present invention is not a generic image file, but an image file changed with embedded html on a wrap, with the html image FRS-readable and specifically matched against a sanctioning body, team, or sponsor-created database or the like, which is part of our Invention and system. Moreover, the location of logotypes and other images or the like on a race car's livery "wrap" are, by tradition, highly-predictable (e.g., a primary sponsor has a larger graphic presence than a supply-chain sponsor, whose image is often indiscernible at speed and at an oblique angle and benefits greatly from the Invention).

Our invention's ability to read and identify images such as logotypes at oblique angles under speed in, on, or around a race vehicle multiplies access to the smallest, most-hidden sponsors with a link to their databases that shatters the conventional wisdom that 20% or so of the "livery" is unusable for images and therefore, cannot be monetized. This is a financial game-changer for racing series teams that are grossly underfunded and, thereby, barely competitive from a technology standpoint.

An understanding of the mechanics of a moving vehicle, under speed, is important. The Rotation of a moving vehicle on the longitudinal axis (x-axis, front-to-rear) of the car is called "rolling," while rotation on the horizontal axis (y-axis, horizontally through the vehicle) is called "pitching." The roll and pitch of a moving vehicle (say, a racecar viewed on a screen) may create an oblique angle that is in some way foreshortened by the rules of perspective or a modern camera lens or distorted when a car rolls under high g-forces in a corner, thereby distorting or hiding parts of sponsor images on the side of the vehicle, while showing parts of the logotypes on the hood, wing(s), or top. This compromises the viewer's line-of-sight of a logotype, if not obscuring part or parts of it from the screen shot. As the vehicle's center-of-gravity changes through centrifugal force and braking (for example), the vehicle's torsional stiffness may also change (e.g., the chassis begins to roll, etc.) and various parts of the vehicle in real-time may become less visible.

As used herein, the term "images" refers to an advertisement, a logo, symbol, figure, word(s), image and the like, which appear to be on, inside, or in the vicinity of the moving vehicle. The real-time digital interactive images are in the form of pixels as a pass-through, via click to a database. In one embodiment, the use of artificial intelligence (Facial Recognition Software) is used to support the identification of the images. With a limited number of images that don't change shape, FRS can read an image at fast speeds and acute angles. They can advertise anything such as a product, a service, general information, race information, and the like. The real-time digital interactive image, for example, can be produced by blue screen technology, HTML hyperlink, pixel images, wireless technology, artificial intelligence or the like, but must also preserve a HTML hyperlink associated with the digital interactive advertisement when the live feed is paused. The real-time digital image serves as a clickable image that also acts as a HTML hyperlink.

An image is an image that also acts as an HTML hyperlink. In digital imaging, a "pixel" or picture element is the smallest controllable element of a picture represented on a smart screen in a raster image. In color imaging systems, a color is typically represented by three or four component intensities (red, green, blue or cyan, magenta, yellow, and black). This is important, as these pixel images, as illustrated in the drawings, may include HTML language which can be read-interpreted by a computer device on a screen (Smart TV, cellular phone, etc.) using facial recognition software. Clicking on any part of the image will redirect the user to another the advertisement. In one embodiment, because of the HTML-configured vinyl wrap described below, an image or a portion of an image may be clicked and the viewer is led to a database with enriched content of interest to the viewer.

Simple HTML, placed on a HTML-configured vinyl wrap is used to create an image as clickable on a digital device, just as a text link. This technology allows the moving vehicle to then become a moving website. The HTML tags used to display images are called img tags. These have an attribute called System Resource Controller (SRC) that points to the URI (Universal Resource Identifier) or the path to the image file. The HTML tag that is created that creates a link is called a hyperlink tag or just an <a> tag. The <a> tag takes a mandatory argument called Hypertext Reference (HREF) which points to the target link or target URI. The text between the start and the end of <a> tag is the clickable part of the link. In order to make an image clickable, all that has to be done is to use both of these tags together. In order to make the sponsor image clickable, the <img> tag will be surrounded with the <a> tag. Essentially, it replaces the text, which is the clickable part of the link, with the sponsor image itself. With the above code, the resulting image is now a link and clicking on it will load the page referred to by the HREF attribute which is /path/to/target.html, in this example. In the present invention, the code is embedded in the digitized image, which is transferred to the vinyl wrap/livery of the race car. However, with current technology, the HTML is difficult to impossible to read at high speeds or acute angles that occur on race vehicles.

An increasing number of race cars are wrapped in a special sheet of 3M™ vinyl wrap, nose-to-tail, sponsor(s)-specific. The vendors use computers that can easily modify the design and use digital ink jet printers to input the image on vinyl in 90 minutes. NASCAR® has actually moved individual race car numbers forward, off what is traditionally a door on your daily-driver, to provide more livery space on the "wrap" for additional advertising. These wraps, known as the "wave of the future" for racing series, are already employed by some 50% of NASCAR® racers-on-the-grid. As the wraps weigh on average about nine pounds less than a painted livery with full decals, they also provide a weight and potential aerodynamic advantage to teams. Important to the present invention is that the pixels can be exploited as described above and become interactive on the computer screen through embedded HTML, easily done when the images are digitally scanned for the race car "wrap". Using artificial intelligence (AI) through Facial Recognition Software, even traditional pixels displayed in the cockpit of the race car (or billboards or images in pit lane, or the like) can be interpreted and linked to a recognition database and HTML hyperlink to websites for additional viewer content even at high speeds and acute angles. Exploring how Facial Recognition Software works and how it's used to identify images instead of faces is an important embodiment of the present invention for recognizing images. In the present invention: 1. Image is captured. 2. Using the special pixels of the image described herein (instead of search for human eye), the "captured image" is, 3. Converted to a grayscale and cropped into a predetermined size (here, the size of the image). 4. The image is converted to a "template" (created by a sanctioning body, a team, or a racetrack, or the like, for example) and compared to other images on file. 5. Once matched, the FRS accesses the specific image's database and the viewer chooses specific content via click. Off the shelf facial recognition software can be used for the purpose of the invention as long as it can accept use of a limited number of images that don't change shape, like faces.

This shell application of a hybrid form of artificial intelligence (Facial Recognition Software) to a paused image of a vehicle, allows partially visible images (e.g., near the wheel well, in the cockpit, or at an oblique angle) to be identified through comparison with the finite image database, and once the identification is made, will enable the viewer to engage (click) with enriched content. The system of the present invention provides exposure for small, often hidden images by identifying them as the cursor moves over the vehicle and enabling click-through in the application. The ability of the AI to read the only partially-visible images, often indiscernible by the human eye, under the speed of a moving vehicle or partially-obscured billboard (also to be added to the database) is a major, disruptive advancement and serves to meet the "substantial" test through the multiplier effect of revenue stream. Again, in-kind, suppliers notoriously have their images applied in obscure, often inopportune places. Now, for the first time we have value-added to the mere "donation" of some widget by a sponsor (brake line, etc.) with inclusion and attachment within a database. This is a huge advancement in race car image technology.

As used herein, the term "digital overlays" refers to a live event broadcast, wherein an image, information text, or the like, is added as an additional layer to the live broadcast a user is viewing on the computer.

As used herein, the term "other objects" refers to other stationary or moving objects that may be in view or in the vicinity during the live feed, such as a parked race car, advertisements in the stands, the pit, crowds, and the like.

As used herein, the term "hyperlink" refers to the ability to click on the live feed or paused interactive advertisement and be relocated to a new area of content or another website, live location, selection of items, and the like by matching the image to content.

In short, the present invention works in the following embodiment: 1. Teams, sanctioning bodies, race tracks, or the like, scan and digitize a limited number of sponsor images for the vehicle race as pixels. 2. Using the described vinyl wrap and the digitized images via a digital printer, the wrap-shop specialists create and apply the digital livery to the racing vehicle. 3. Sanctioning bodies, et al. offer users on user computers a form of "freeware" that includes a version of Facial Recognition Software that can read a limited number of images, compare images or partial views with a database that becomes viewer interactive with a simple click (several companies offer "apps" of Facial Recognition Software easily adapted for the present invention's use). 4. User viewing a race in digital format sees an image on a racing vehicle, pit lane, racing venue, driver helmet, cockpit, or the like, and clicks the standard pause-and-play button. 5. The viewer rolls the cursor (or other pointing/selection device) over the partial or complete image and clicks. 6. Facial Recognition Software matches the image with the database and connects the viewer to a product advertisement, an event, place, organization, website, game, different camera angles, interviews, or the like. 7. Upon completion of viewing/downloading special content/promotions, or the like, the viewer re-clicks the standard pause-and-play button and is rejoined to the race where it left off. Because the facial recognition software has a limited library of images, and the images don't move or change like a human face, the software that has been discovered can read the images at acute angles on a high speed moving vehicle where previous methods fail.

The result is: a moving billboard (e.g., a race car) becomes a moving website/database-in, and of itself, a multiplier, and a disruptive use of the known uses of "parts", combined with Facial Recognition Software alterable and exploitable for totally-unrelated and yet unpredicted use resulting in a vast improvement in the readability of images on moving vehicles.

DRAWINGS

Now referring to the drawings, FIG. 1a is a side perspective view of the present invention. In this view, a moving vehicle, in this embodiment, is a live video of a race car 1 shown on computer screen 2. Also, on computer screen 2 is computer arrow/pointer/cursor 3 for positioning and clicking on real-time digital images 6, 7, 8, and 9 with computer mouse 10 to activate pixels with a hyperlink associated with the real-time digital interactive images 6, 7, 8, and 9. In one embodiment, the live stream is paused in order to make it easier to click on the real-time digital interactive images 6, 7, 8, and 9.

Figure 1B:
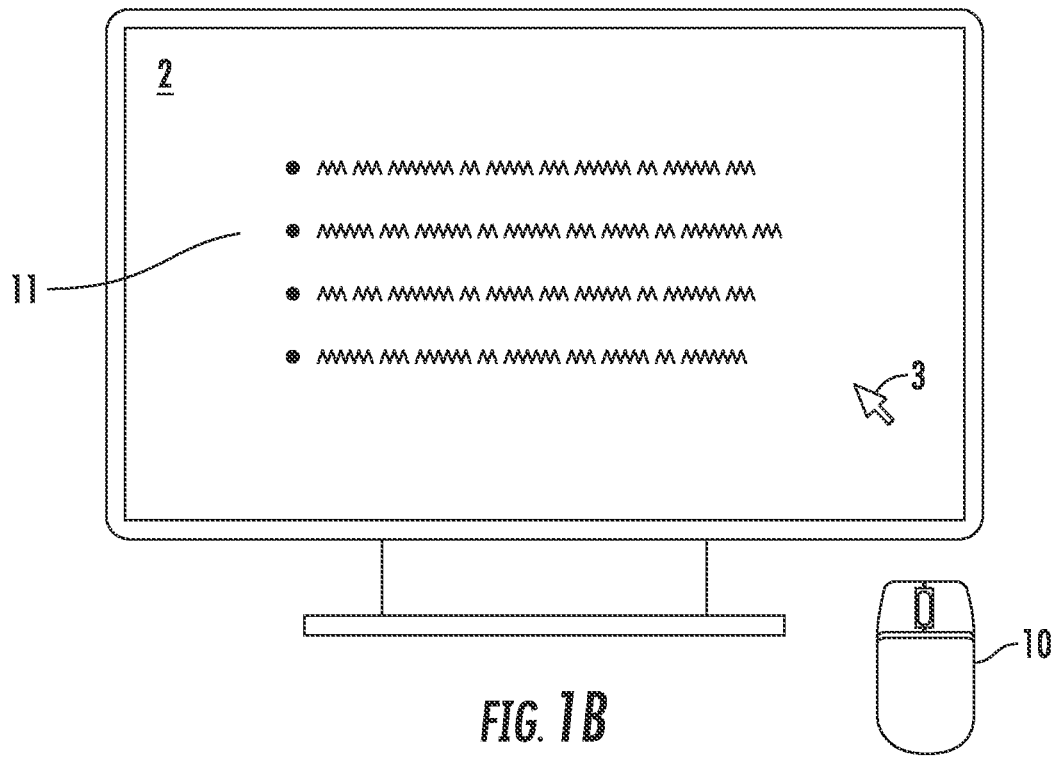
FIG. 1b is a perspective view of the present invention showing the image on a computer after the HTML hyperlink has been activated.

FIG. 1*b* shows the computer screen 2 after the hyperlink has been activated and subsequently, has taken the user to a page 11 where the user encounters a list of items.

Figure 2:
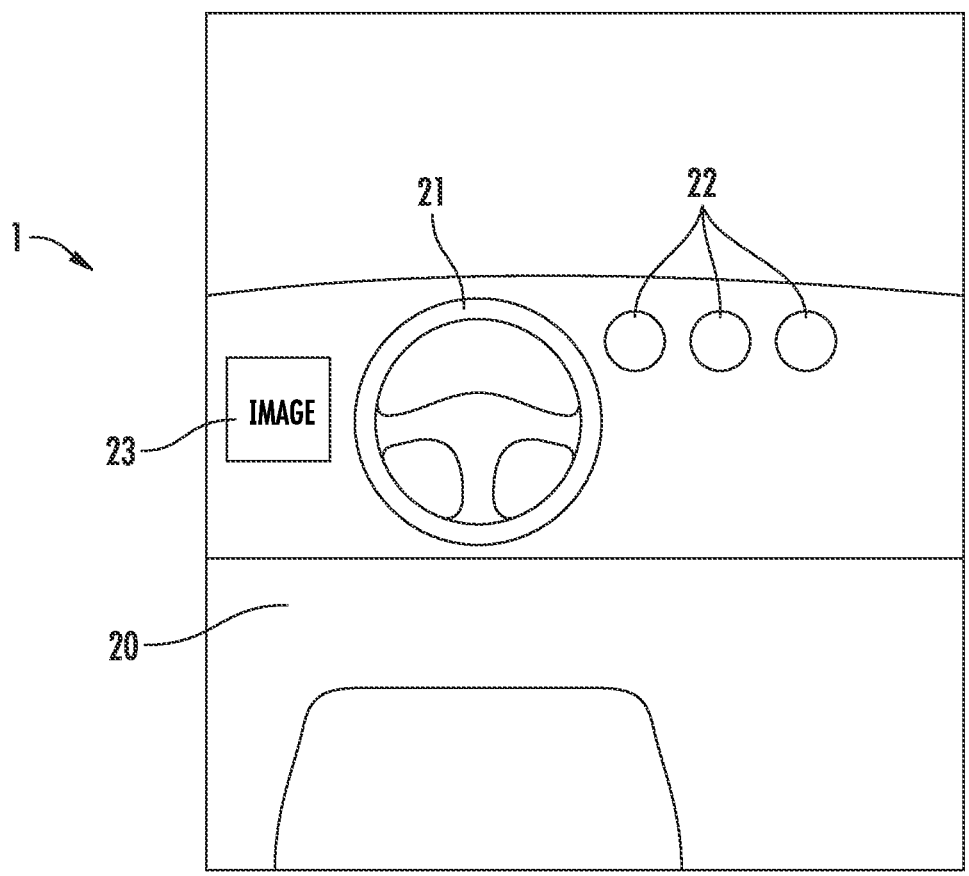
FIG. 2 is a perspective view of the cockpit of a moving vehicle showing an image placement of the present invention on the dash of the moving vehicle.

FIG. 2 shows the cockpit 20 of race car 1. A steering wheel 21 and gauges 22 are shown. A real-time digital interactive image 23 is shown on the live feed. Again, the hyperlink is activated by clicking on the real-time digital interactive image 23 where the live video can be paused to make viewing advertisements easier.

Figure 3:
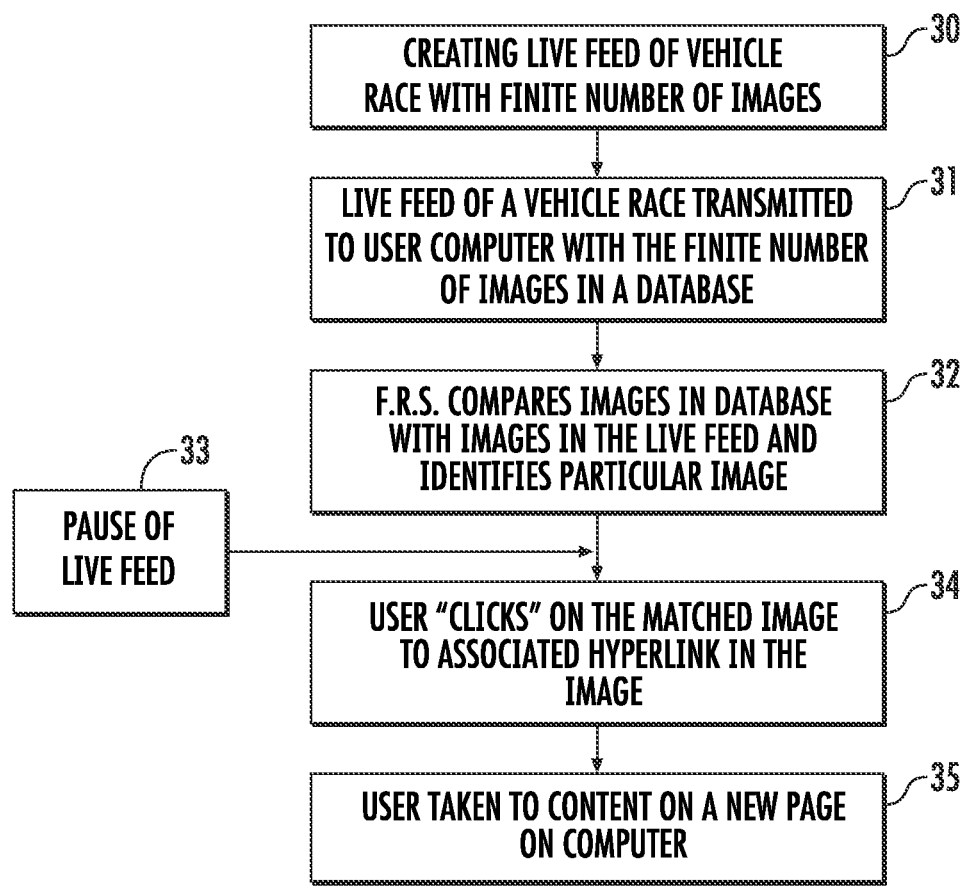
FIG. 3 is a flow chart of the method of use of the present invention.

FIG. 3 is a flow chart of the method of using the real-time digital interactive image system. The system starts with a race vehicle with one of a finite number of images on or near the vehicle 30, wherein a live feed of the images is transmitted to a user computer with the finite number in its database 31 with a database of the finite number of images. The inside, outside, and general vicinity of the moving vehicle are fitted with digital interactive images are matched to a database by the Facial Recognition Software 32. The user is then able to pause the live feed 33 and click on the matched image 34 to activate the hyperlink. Lastly, the user is relocated to a new area of content (a new webpage, or the like) 35.

Figure 4:
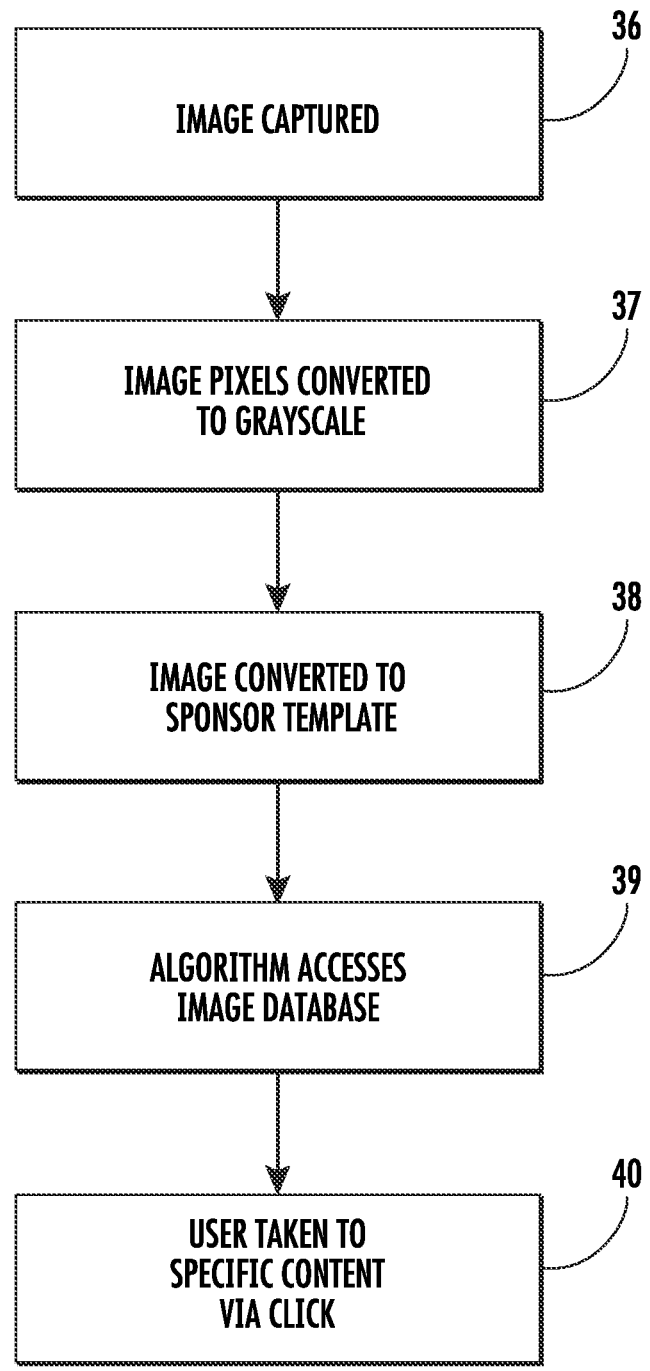
FIG. 4 is a flow chart of the method of using a Facial Recognition Software system.

FIG. 4 is a flow chart of the method of using a Facial Recognition Software system to identify images of the present invention. An image is captured 36. Using special pixels of the image, the captured image is converted to grayscale 37 and cropped into a predetermined size. The image is then converted to a sponsor template 38 and, when clicked on by the user, the image is compared to other images using Facial Recognition Software (for purpose of identification) on the user computer that are within a file/database of advertisements, events, places, organizations, logos, websites, games, camera angles, interviews, and the like (i.e. images). Once the image is matched to an image in the database by the FRS, the algorithm accesses the specific image's file/database 39 and the viewer chooses specific content based on the specific image's content. When the user chooses a specific image, or the like, to view, the user will click on the content and is taken to the specific content 40 relating to the image.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A system for reading a finite number of advertising images having HTML machine readable pixels on a moving vehicle in a vehicle race comprising:
   a) a computer with a computer database having a copy of the finite number of advertising images, the computer configured to receive a single advertising image from a camera of one of the finite number of advertising images on the moving vehicle in the vehicle race;
   b) facial recognition software on the computer which reads the HTML machine readable pixels which compares the single advertising image from the camera with the copy of the finite number of advertising images in the computer database to select an advertising image in the computer database that matches the single advertising image from the camera on the moving vehicle in the vehicle race creating a matched advertising image;
   c) wherein the facial recognition software reads the single advertising image from the camera which single advertising image is at oblique angles and moving at high-speed relative to the camera; and
   d) wherein the software opens up a website associated with the matched advertising image.

2. The system according to claim 1, which further comprises one or more digital overlays on the moving vehicle.

3. The system according to claim 1, which further comprises the finite number of advertising images on objects that are inside the vehicle or in the vicinity of the vehicle.

4. The system according to claim 1, wherein the finite number of advertising images having HTML machine readable pixels on the outside of the moving vehicle are placed on a vinyl wrap.

5. A method of identifying one of a finite number of interactive advertising images placed on a moving vehicle in a vehicle race comprising:
   a. placing the finite number of interactive advertising images on the moving vehicle;
   b. sending a live advertising image from a single camera of one of the finite number of interactive advertising images to a user computer having a copy of the finite number of interactive advertising images in a computer database wherein the single camera captures the live advertising image which is at an oblique angle and moving at high speeds relative to the camera;
   c. comparing the live advertising images from the single camera to the copy of the finite number of interactive advertising images in the computer database using a Facial Recognition Software which reads HTML machine readable pixels on the user computer to create a matched advertising image;
   d. a user then clicks on the matched advertising image to activate a hyperlink associated with the matched advertising image; and
   e. wherein the user computer takes the user to associated content on the hyperlink.

6. The method according to claim 5 which further comprises identifying finite number of interactive advertising images located inside or near the race vehicle.

\* \* \* \* \*